United States Patent
Wang

(10) Patent No.: US 10,257,510 B2
(45) Date of Patent: *Apr. 9, 2019

(54) MEDIA ENCODING USING CHANGED REGIONS

(71) Applicant: INTEL CORPORATION, Santa Clara, CA (US)

(72) Inventor: Changliang Charlie Wang, Bellevue, WA (US)

(73) Assignee: Intel Corporation, Santa Clara, CA (US)

(*) Notice: Subject to any disclaimer, the term of this patent is extended or adjusted under 35 U.S.C. 154(b) by 9 days.

This patent is subject to a terminal disclaimer.

(21) Appl. No.: 15/232,126

(22) Filed: Aug. 9, 2016

(65) Prior Publication Data
US 2016/0353101 A1 Dec. 1, 2016

Related U.S. Application Data

(63) Continuation of application No. 13/568,703, filed on Aug. 7, 2012, now Pat. No. 9,424,660.

(51) Int. Cl.
| | |
|---|---|
| H04N 19/107 | (2014.01) |
| G06T 9/00 | (2006.01) |
| H04N 19/137 | (2014.01) |
| H04N 19/17 | (2014.01) |
| H04N 19/87 | (2014.01) |
| H04N 19/507 | (2014.01) |
| H04N 21/234 | (2011.01) |

(52) U.S. Cl.
CPC .............. *H04N 19/107* (2014.11); *G06T 9/00* (2013.01); *H04N 19/137* (2014.11); *H04N 19/17* (2014.11); *H04N 19/507* (2014.11); *H04N 19/87* (2014.11); *H04N 21/234* (2013.01)

(58) Field of Classification Search
None
See application file for complete search history.

(56) References Cited

U.S. PATENT DOCUMENTS

| | | | |
|---|---|---|---|
| 5,861,922 A * | 1/1999 | Murashita | H04N 9/8047 375/240.24 |
| 2002/0165988 A1 | 11/2002 | Khan et al. | |
| 2006/0082583 A1 | 4/2006 | Leichtling et al. | |

(Continued)

FOREIGN PATENT DOCUMENTS

| | | |
|---|---|---|
| CN | 101404752 A | 4/2009 |
| CN | 102148843 A | 8/2010 |

(Continued)

OTHER PUBLICATIONS

International Search Report received for PCT Patent Application PCT/CN2012/080407, dated May 23, 2013, 3 pages.

(Continued)

*Primary Examiner* — Xiao M Wu
*Assistant Examiner* — Steven Z Elbinger
(74) *Attorney, Agent, or Firm* — International IP Law Group, P.L.L.C.

(57) ABSTRACT

A method and system for media encoding using changed regions. The method includes detecting the changed regions and a static portion of a desktop of a computing device. The amount of changed regions may be determined. The changed regions may be encoded in response to the amount of changed regions.

23 Claims, 11 Drawing Sheets

(56) References Cited

U.S. PATENT DOCUMENTS

| | | |
|---|---|---|
| 2006/0259939 A1 | 11/2006 | Chu et al. |
| 2007/0127569 A1 | 6/2007 | Hatalkar |
| 2008/0151997 A1* | 6/2008 | Oguz ............... H04N 19/129 375/240.02 |
| 2009/0097546 A1* | 4/2009 | Lee .................. H04N 19/61 375/240.02 |
| 2009/0247066 A1 | 10/2009 | Ho et al. |
| 2009/0309897 A1 | 12/2009 | Morita et al. |
| 2010/0104021 A1 | 4/2010 | Schmit |
| 2010/0111410 A1 | 5/2010 | Lu et al. |
| 2010/0118972 A1* | 5/2010 | Zhang ............ H04N 21/23412 375/240.24 |
| 2011/0099591 A1 | 4/2011 | Long et al. |
| 2011/0135090 A1 | 6/2011 | Chan et al. |
| 2011/0141133 A1 | 6/2011 | Sankuratri et al. |
| 2011/0150433 A1* | 6/2011 | Alexandrov ............ H04N 5/91 386/328 |
| 2011/0270959 A1 | 11/2011 | Schlusser et al. |
| 2012/0042275 A1 | 2/2012 | Neerudu et al. |
| 2012/0141038 A1 | 6/2012 | Horio et al. |
| 2012/0154426 A1* | 6/2012 | Darsa ................. G09G 5/14 345/592 |

FOREIGN PATENT DOCUMENTS

| | | |
|---|---|---|
| CN | 101964860 A | 2/2011 |
| CN | 102377823 A | 3/2012 |
| EP | 1777876 A2 | 4/2007 |
| JP | 2010171876 A | 5/2010 |
| JP | 2012014533 A | 1/2012 |
| JP | 2012120066 A | 6/2012 |
| KR | 20070122039 A | 12/2007 |
| KR | 10-0793428 B1 | 1/2008 |
| KR | 20090123916 A | 12/2009 |
| KR | 10-1017866 B1 | 3/2011 |
| WO | 2009102011 A1 | 8/2009 |
| WO | 2014008024 A1 | 1/2014 |
| WO | 2014025452 A1 | 2/2014 |
| WO | 2014029076 A1 | 2/2014 |

OTHER PUBLICATIONS

International Search Report received for PCT Patent Application No. PCT/US2013/045662, dated Sep. 17, 2013, 3 pages.
International Search Report received for PCT Patent Application No. PCT/US2013/047333, dated Oct. 22, 2013, 3 pages.
Supplementary European Search Report, EP Application No. EP13798231, date of completion Mar. 4, 2016, 2 pages.

* cited by examiner

900

MEDIA ENCODING USING CHANGED REGIONS

CROSS REFERENCE TO RELATED APPLICATION

This application is a continuation of U.S. application Ser. No. 13/568,703 filed Aug. 7, 2012 entitled "Media Encoding Using Changed Regions", which is incorporated by reference herein in its entirety.

TECHNICAL FIELD

The present invention relates generally to media encoding. More specifically, the present invention relates to media encoding using changed regions.

BACKGROUND ART

Various uses of a computing device include scenarios with a portion of the display being static, while other portions of the display are active. For example, wireless display (WiDi) is a technique by which a desktop of an electronic device is rendered on a remote display, wirelessly. For example, a tablet device may send all images on its desktop to a television to be rendered. Typical uses for WiDi may include online video playback over a web browser and video chat. Each of these uses involve a portion of the display that is static, while another portion of the display may be dedicated to the video encoding over a web browser or video chat. In other examples, participating in a video conference includes a portion of the display that is static, and another portion of the display that is dedicated to rendering images of other the video conferencing participants. In any event, the use of WiDi and video conferencing may consume a relatively large amount of power, as the images from the display to be rendered are typically encoded, decoded, and processed.

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Figure 1A:
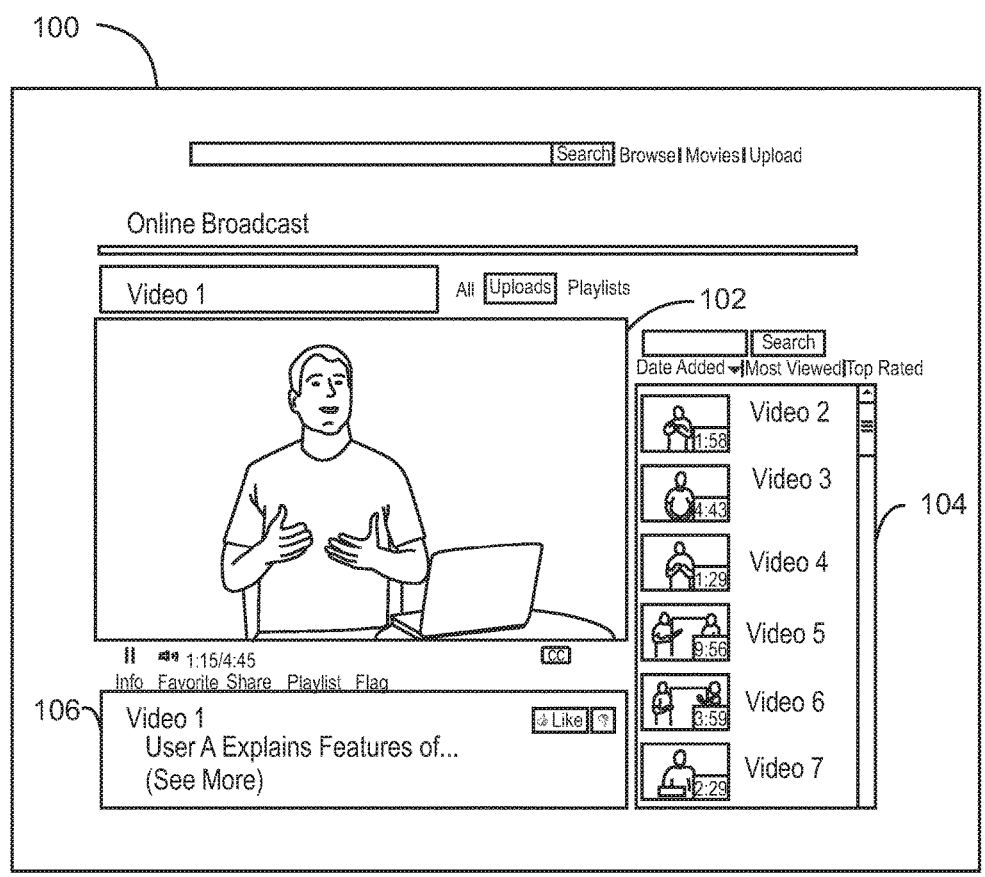
FIG. 1A is a diagram of media encoding within a web browser, in accordance with embodiments.

As discussed above, WiDi is a technique by which the images on a display of a computing device are wirelessly rendered on a remote display. The display of a computing device may be referred to as a desktop, and can include several icons and applications in various positions on the desktop. Traditional implementations of WiDi encode the entire contents of the desktop, wirelessly send the encoded desktop to another device, then decode and process the entire desktop in order to render the desktop on another display, such as a television or computer monitor. Processing the entire desktop using WiDi techniques can consume a large amount of power. Additionally, processing the entire desktop using traditional WiDi techniques can consume a large amount of graphics processing unit (GPU) time and a large portion of network bandwidth. Similarly, video conferences may be rendered on a computing device by decoding, encoding, and processing a data stream composed of the entire desktop. Processing the entire desktop of a video conference can consume a large amount of GPU time and a large portion of network bandwidth. Both GPU bottlenecks and a lack of network bandwidth may contribute to latency in rendering the desktop during a video conference or a WiDi session. Accordingly, embodiments described herein relate to media encoding using changed regions. The dynamic content of the media may be sent to a display for rendering along with changed region position values.

The use of changed regions is an image rendering technique where the desktop is divided into several regions. As used herein, a region refers to an area of the desktop, of any size or shape. For example, a region may be in the shape of a rectangle. Regions may be obtained from the desktop at various intervals. A region may be a changed region when one or more pixels within the region have changed when compared with a previous region that is the same size and shape as the region, and is in the same position on the desktop as the region. When the region is a rectangle, and the rectangle contains any changed pixels, it may be referred to as a dirty rectangle. In embodiments, each changed region may be written to a buffer in order to be composed with a static portion of the desktop and rendered.

In embodiments, a change in a pre-determined number of pixels may indicate a changed region. A changed pixel is a change in any value of the pixel, including but not limited to, address, intensity, color, or any combination thereof. The pre-determined number of pixels may be a threshold for determining a changed region. The threshold may be any number of pixels. For example, a threshold may indicate that ten percent or more of the pixels within a region should change in order for the region to be a changed region. Accordingly, if less than ten percent of the pixels with the region change, then the region may not be considered a changed region. In this manner, a changed region may be detected when a number of changed pixels within a region that have changed is greater than the predetermined threshold. For example, the threshold may be lower in applications where premium graphics are displayed, such as high definition playback. When high definition playback is performed, the threshold may be selected in a manner such that high definition playback can be achieved while encoding the playback using changed regions. Additionally, in embodiments where power savings is a concern, the threshold may be set in a manner that enables a device to conserve power while encoding a playback using changed regions.

FIG. 1A is a diagram of media encoding within a web browser 100, in accordance with embodiments. The web browser 100 includes an area 102 that renders a video selected by a user. The area 102 could be a single region or the area 102 could include several regions, as described above. The remaining components of the web browser 100 are typically fixed while the area 102 is playing a video selected by a user. Accordingly, links to other videos within an area 104 typically remain unchanged while area 102 is changing due to media playback. Further, the article in area 106 below the area 102 remains unchanged while media is being played within the area 102. As used herein, media playback refers to any dynamic content, such as online video broadcasts or video conferencing images. Additionally, similar to the area 102, the remaining components of the web browser 100 may form a single region or several regions of the web browser 100. In embodiments, the region may include contiguous or non-contiguous pixels.

Generally, media playback on a computing device includes an area, such as area 102, that is dedicated to media playback, and thus changes over time and is dynamic. For example, a video chat application enables a local user to talk with a remote user using a camera and microphone of a computing device. The area that renders the images or video of the remote user to the local user is constantly changing in response to the various positions of the remote user. The remainder of the display, which can include a background of the computing device as well as other portions of the video chat application, are typically static. In another example, a presentation application can enable one or more users to connect to an electronic presentation. During the electronic presentation, one or more users may interact with slides that are rendered during the presentation. The area that renders images of the slides is constantly changing, while the remainder of the display is static.

Figure 1B:
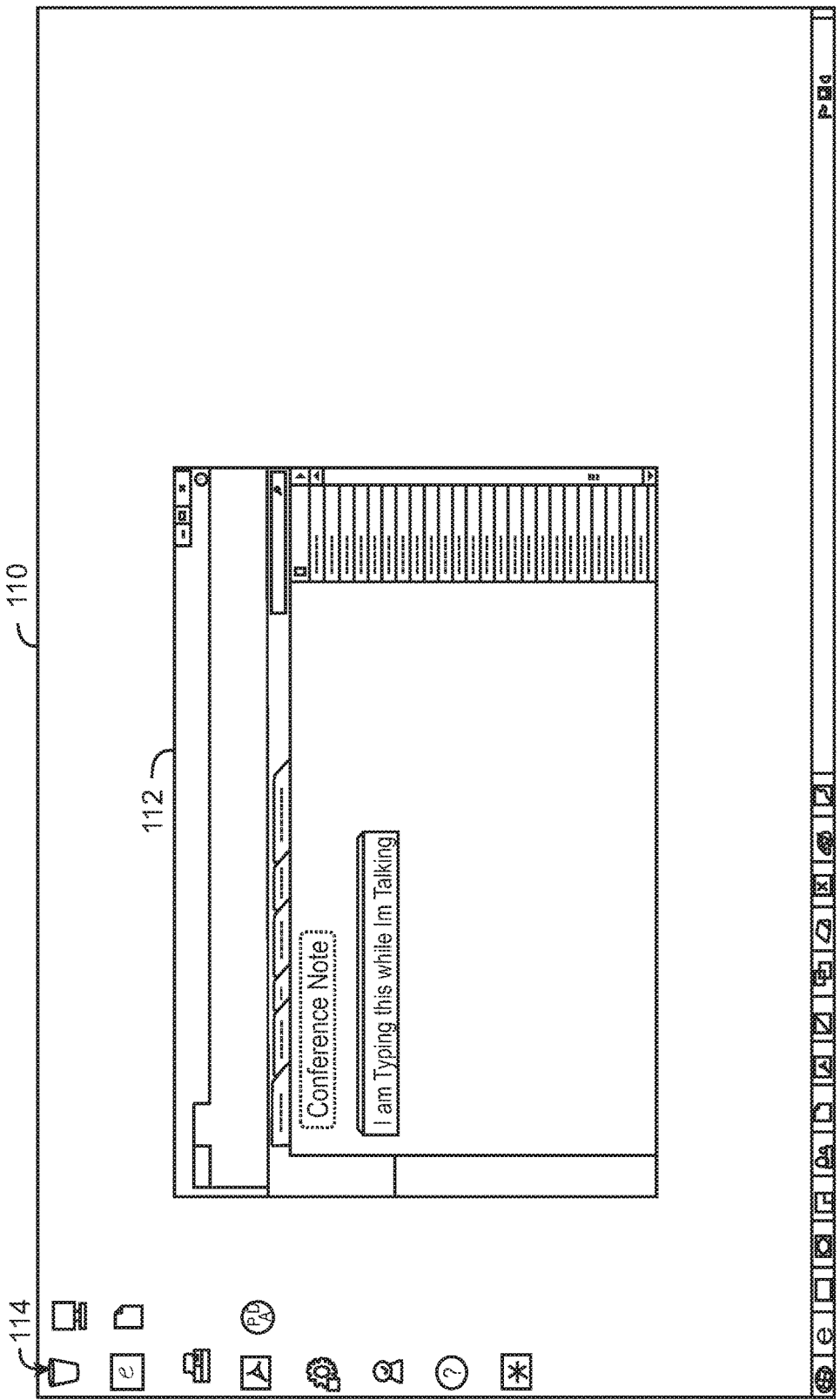
FIG. 1B is a diagram of media encoding of a video conference, in accordance with embodiments.

FIG. 1B is a diagram of media encoding of a desktop 110 with a video conference, in accordance with embodiments. The desktop 110 includes an area 112 that renders documents, slides, images, and videos presented during the video conference. The area 112 could be a single region or the area 112 could include several regions. The remaining components of the desktop 110 are typically fixed while the area 112 changes in response to the information presented during the video conference. For example, the icon at reference number 114 is generally static during the video conference presented within the area 112. The remaining components of the desktop 110 may form a single region or several regions of the desktop 110.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the inventions. The various appearances of "an embodiment," "one embodiment," or "some embodiments" are not necessarily all referring to the same embodiments. Elements or aspects from an embodiment can be combined with elements or aspects of another embodiment.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

Figure 2:
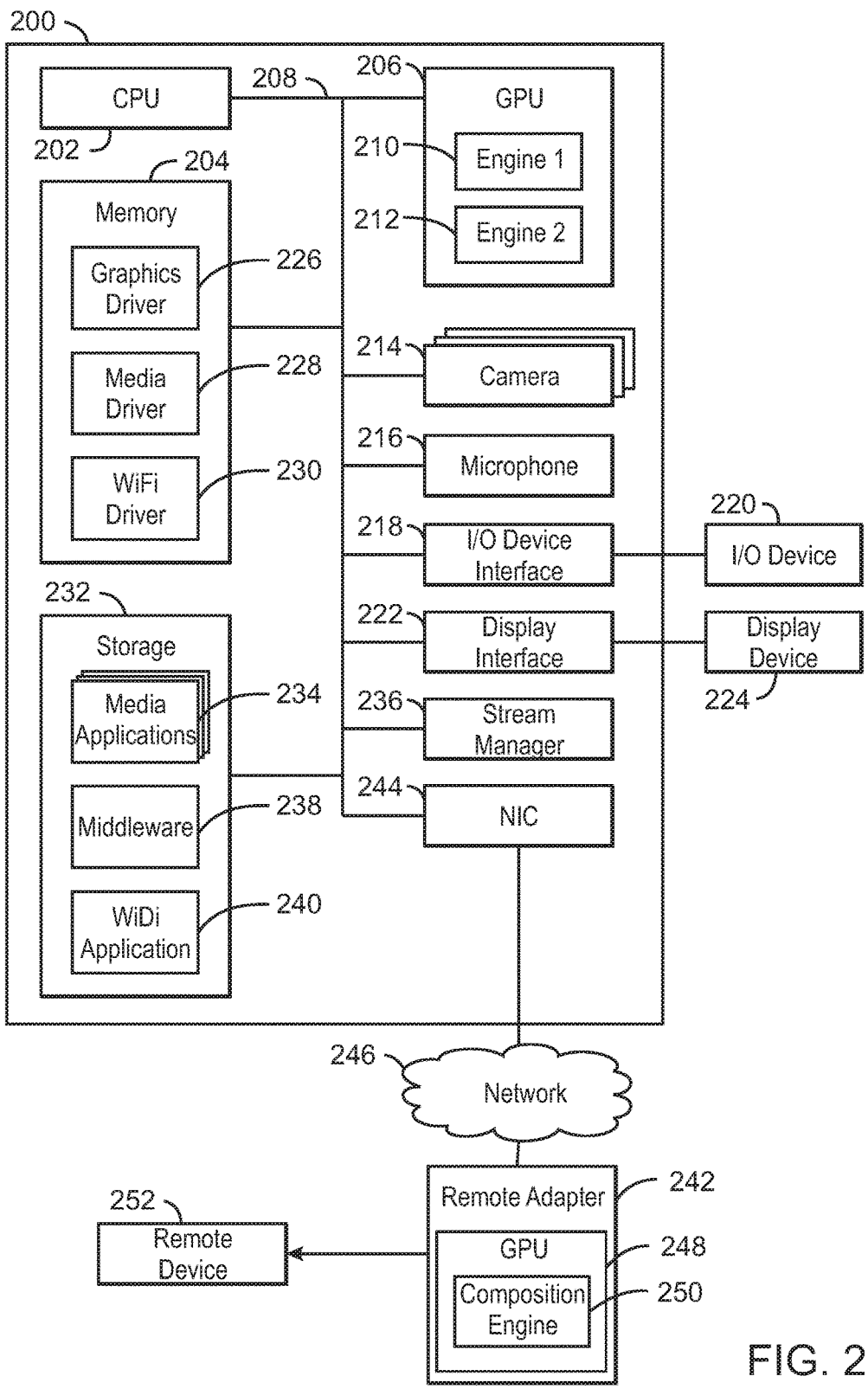
FIG. 2 is a block diagram of a computing device that may be used to provide media encoding using changed regions, in accordance with embodiments.

FIG. 2 is a block diagram of a computing device 200 that may be used to provide media encoding using changed regions, in accordance with embodiments. The computing device 200 may be, for example, a laptop computer, desktop computer, tablet computer, mobile device, server, or cellular phone, among others. The computing device 200 may include a central processing unit (CPU) 202 that is configured to execute stored instructions, as well as a memory device 204 that stores instructions that are executable by the CPU 202. The CPU 202 can be a single core processor, a multi-core processor, a computing cluster, or any number of other configurations. Furthermore, the computing device 200 may include more than one CPU 202. The instructions that are executed by the CPU 202 may be used to implement media encoding using changed regions. The memory device 204 can include random access memory (RAM), read only memory (ROM), flash memory, or any other suitable memory systems. For example, the memory device 204 may include dynamic random access memory (DRAM).

The computing device 200 may also include a graphics processing unit (GPU) 206. As shown, the CPU 202 may be connected through a bus 208 to the GPU 206. The GPU 206 may be configured to perform any number of graphics operations within the computing device 200. For example, the GPU 206 may be configured to render or manipulate graphics images, graphics frames, videos, or the like, to be displayed to a user of the computing device 200. The GPU 206 may also include one or more engines, such as the engine 210 and engine 212. An engine is a component of a GPU that may be used for parallel processing of data sent to the GPU. Although two GPU engines are shown, the GPU may contain any number of engines. In embodiments, the engine 210 or the engine 212 is a composition engine that may be used to compose the static portion of the desktop with the dynamic areas of the desktop during video conferencing or WiDi.

The computing device 200 may also include one or more cameras 214. The cameras 214 may be used to capture video and images for various uses, such as video conferencing and video chat applications. Additionally, the computing device 200 includes a microphone 216 that may be used to capture sound for various uses, such as a video conferencing and video chat applications. The CPU 202 may be connected through the bus 208 to other input/output (I/O) components using an I/O device interface 218 configured to connect the computing device 200 to one or more I/O devices 220. The I/O devices 220 may include, for example, a keyboard and a pointing device, wherein the pointing device may include a touchpad or a touchscreen, among others. The cameras 214, microphone 216, and I/O devices 220 may be built-in components of the computing device 200, or may be devices that are externally connected to the computing device 200.

The CPU 202 may also be linked through the bus 208 to a display interface 222 configured to connect the computing device 200 to a display device 224. The display device 224 may include a display screen that is a built-in component of the computing device 200. The display device 224 may also include a computer monitor, television, or projector, among others, that is externally connected to the computing device 200.

The memory device 204 may include one or more drivers. The drivers enable a piece of hardware or an application to communicate with the operating system, applications, or other hardware of the computing device 200. As used herein, the ability to communicate includes the conversion of data from one format to another, or any technique that facilitates the processing or transfer of data between hardware or software components. For example, the computing device 200 may include a graphics driver 226, a media driver 228, and a WiFi driver 230. The graphics driver 226 enables the GPU to communicate with the operating system and various applications, while the media driver 228 enables a media application to communicate with the operating system and various applications. The WiFi driver 230 enables the operating system to communicate with hardware and applications responsible for wireless transmissions to and from computing device 200.

The computing device 200 may also include a storage 232. The storage 232 is a physical memory such as a hard drive, an optical drive, a thumbdrive, an array of drives, or any combinations thereof. The storage 232 may also include remote storage drives. The storage may also include one or more media applications 234. The media applications 234 include, but are not limited to, video playback applications, video chat applications, video conferencing applications, and presentation applications. In examples, the media driver 228 may include a timer that is used to schedule intervals for detecting any changed regions from the media application 234. Additionally, in examples, a media application 234 may be polled by the media driver 228 in order to detect any changed regions from the media application 234 at various intervals. Furthermore, in examples, the changed regions are pushed to the media driver 228 by the media application 234 when they are detected at various intervals. The changed regions may also be pulled from the media application 234 by the media driver 228 when changed regions are detected at various intervals.

The media playback from media applications 234 may be sent to a stream manager 236 along with the other contents of the desktop. The stream manager 236 may mange the encoding, decoding, and composition of the desktop. In embodiments, the stream manager 226 may obtain position values for each changed region.

The storage 232 may also include a middleware 238 and a WiDi application 240. The middleware 238 may be used to encode the changed regions and calculate position values of the changed regions. The WiDi application may prepare the encoded changed regions and their position values to be sent wirelessly to a remote adapter 242. The remote adapter may be physically separated from the computing device 200. In embodiments, the remote adapter 242 is another computing device. A network interface controller (NIC) 244 may be configured to connect the computing device 200 to a network 246. Network 246 can be a wire line network, a wireless network, or a cellular network. The network 246 may be any wide area network (WAN), any local area network (LAN), or the Internet, among others. For example, network 246 can be 3GPP LTE network or a WiFi network. In embodiments, a remote adapter 242 may obtain encoded changed regions from the computing device 200 using the NIC 244 and the network 246.

The remote adapter 242 may contain a GPU 248. The GPU 248 may include a composition engine 250. In embodiments, the composition engine 250 may compose the changed regions with a static portion using the changed region position values. The static portion includes the areas of the desktop that do not include changed regions. The composed changed regions and static portion may be rendered on a remote device 252. In embodiments, the remote adapter 242 and the remote device 252 are the same component.

The block diagram of FIG. 2 is not intended to indicate that the computing device 200 is to include all of the components shown in FIG. 2. Further, the computing device 200 may include any number of additional components not shown in FIG. 2, depending on the details of the specific implementation.

Figure 3:
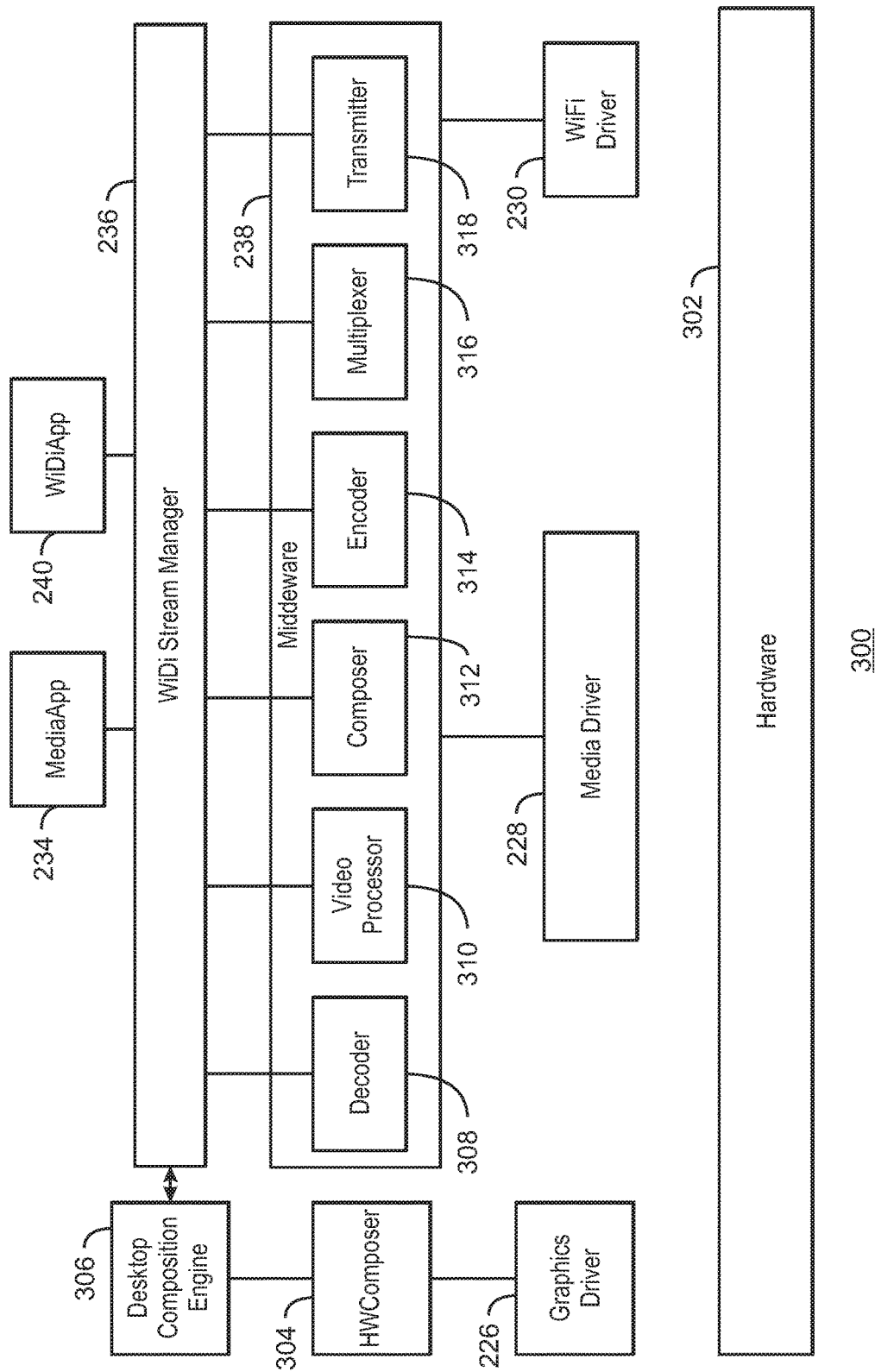
FIG. 3 is a schematic of a WiDi architecture that may be used to provide media encoding using changed regions, in accordance with embodiments.

FIG. 3 is a schematic of a WiDi architecture 300 that may be used for media encoding using changed regions, in accordance with embodiments. Like numbered items are as described with respect to FIG. 2. The WiDi architecture 300 includes hardware 302 that supports the media encoding using changed regions. The hardware may include, but is not limited to, the CPU 202 and the GPU 206 (FIG. 2). The graphics driver 226 enables the hardware to communicate with other hardware and various applications. The hardware composer 304 or the desktop composition engine 306, or any combination thereof, may determine which regions of the desktop have changed. In embodiments, the hardware composer 304 may be a Hardware Composer that is a Hardware Abstraction Layer (HAL) within the Android Operating System by the Open Handset Alliance. Further, in embodiments, the desktop composition engine 306 may be a Desktop Composition Manager or a Desktop Window Manager of the Windows Operating System by Microsoft. Moreover, in embodiments, various hardware such as a fixed function unit, video encoder, or a scene change detection hardware unit may be used to determine the changed regions.

Accordingly, the hardware composer 304, the desktop composition engine 306, fixed function unit, video encoder, or a scene change detection hardware unit may be used to obtain the changed regions. In embodiments, the current regions of the desktop may be compared with preceding regions obtained from the desktop. The regions may be obtained through pushing, pulling, polling, or sent to the hardware composer 304, the desktop composition engine 306, a fixed function unit, a video encoder, or a scene change detection hardware unit from the WiDi stream manager 236 at scheduled intervals as discussed above. If there is a change between a current region of the desktop and the same region previously sent from the WiDi stream manager 236, the region has changed. In embodiments, the region may also be compared to a predetermined threshold of changed pixels. If the number of pixels that have been changed are greater than the predetermined threshold, then the region may be considered a changed region. In response to detecting a changed region, the hardware composer 304, the desktop composition engine 306, a fixed function unit, a video encoder, or a scene change detection hardware unit may send the changed region position values to the stream manager 236.

The WiDi stream manager 236 manages the composition and encoding performed by the middleware 238. In embodiments, the WiDi stream manager communicates with the middleware 238 to obtain the image information of the changed regions, which may include the pixels to encode. The image information corresponds to the changed region position values for the changed regions obtained via one or more of the hardware composer 304, desktop composition engine 306, a fixed function unit, a video encoder, a scene change detection hardware unit, or any combination thereof. In embodiments, the image information of the changed regions form a video surface. As used herein, the video surface is a dynamic portion of the display that is used to render a video or other media on the desktop.

The middleware 238 can obtain the image information on the desktop from the media application 234 through the WiDi stream manager 236. For example, media application 234 may compress a video playback according to video standards such as those by the Moving Picture Experts Group (MPEG) or H.264. The MPEG and H.264 video standards may compress a video by processing the video frame-by-frame and using various encoding algorithms. Middleware 238 may decode the video using a decoder 308.

The middleware 238 may also include a video processor 310 that processes the video as directed by the WiDi stream manager 236. Video processing may include enhancing the decoded video by scaling the video or changing the color space of the video. For example, the video may be scaled from a higher resolution for playback to a lower resolution for playback. In embodiments, the media application 234 is a video conferencing application, and the middleware 238 includes a composer 312 that composes the dynamic portion received from the video conferencing application with the static portion of the desktop. The composed dynamic portion and static portion may be rendered on the computing device, such as computing device 200 (FIG. 2).

The middleware 238 may encode the changed regions using an encoder 314. In embodiments, the middleware 238 includes a multiplexer 316 that combines the image data with audio data. The middleware 238 may also prepare the changed regions for transmission to a remote adapter at block 318 using a transmitter 318. The WiFi driver 230 may enable hardware such as the NIC 244 (FIG. 2) to transmit the encoded changed regions along with their changed region position values using the middleware 238 and the WiDi application 240.

Figure 4:
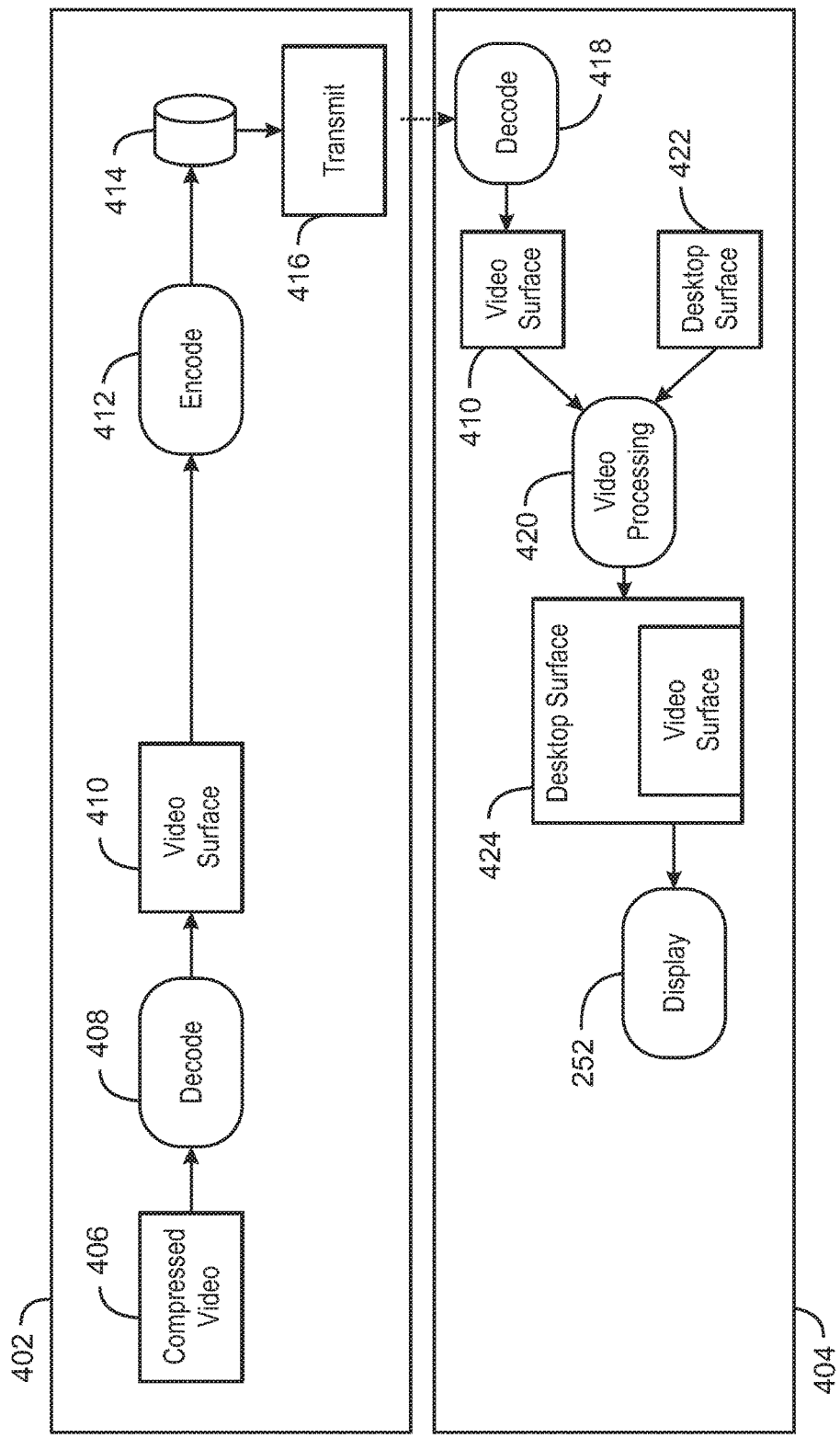
FIG. 4 is a block diagram showing a process flow of a media encoding using changed regions, in accordance with embodiments.

FIG. 4 is a block diagram 400 showing the data flow of media encoding using changed regions, in accordance with embodiments. The client device 402 contains the data flow that may occur using a computing device such as the computing device 200 (FIG. 2), while the remote device 404 contains the data flow that may occur using the remote adapter 242 or the remote device 252 (FIG. 2). In embodiments, media encoding using changed regions occurs using a computing device without the use of WiDi.

The compressed video 406 may be obtained from a media encoding application, such as media application 234 (FIG. 2). The compressed video may be decoded at block 408. As discussed above, the compressed video may be decoded using middleware 228 (FIG. 2). The decoded video may include both a video surface and background surface from the media encoding. As discussed above, the video surface is a dynamic portion of the desktop that changes over time. By contrast, a desktop surface is a static portion the desktop that remains fixed over time. The video surface 410 may be obtained by retrieving the changed regions from middleware 238 as described above with respect to FIG. 3.

The video surface 410 may be encoded at block 412. In embodiments, the encoded video surface is sent to a buffer 414, and then transmitted at block 416 to a remote device 404. The remote device may decode the video surface at block 418. The video surface 410 may be processed at 420 with the static desktop surface 422. Video processing may include, but is not limited to scaling, rotation, and de-noise of the video. The static desktop surface 422 includes regions that are not dirty and have been previously transmitted to the remote device 404. The video surface 410 and the static desktop surface 422 may be composed into one image at block 424. The media encoding may be sent to a display 252 in order to be rendered on the display.

Figure 5:
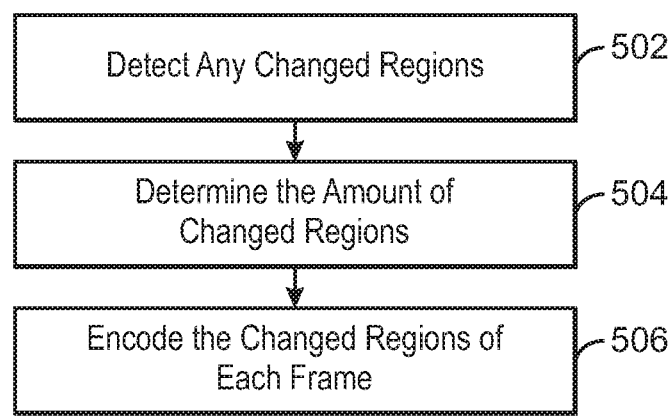
FIG. 5 is a process flow diagram showing a method for media encoding using changed regions, in accordance with embodiments.

FIG. 5 is a process flow diagram showing a method 500 for media encoding using changed regions, in accordance with embodiments. In various embodiments, the method 500 may be executed on a computing device, such as the computing device 200. In other embodiments, the method 500 may be executed using a WiDi architecture such as the WiDi architecture 400 discussed above with respect to FIG. 4.

At block 502, the changed regions and a static portion of the desktop are detected. As discussed herein, the changed regions may be detected by a hardware composer 304 or desktop composition engine 306 (FIG. 3). In embodiments, the changed regions may be detected using a media driver. Furthermore, as discussed above, the changed regions may be dirty rectangles. At block 504, the amount of changed regions may be determined. The amount of changed regions may represent a threshold. In embodiments, if the number of changed regions exceeds the threshold, the entire display should be composed and rendered. At block 506, the changed regions of each frame is encoded. In embodiments, each changed region and the corresponding changed region position values are sent to a composition engine, and encoded changed regions may be decoded. The changed regions may be composed with the static portion using their changed region position values. The composition engine may be located on a remote adapter, or the composition engine may be a component of the computing device that detects the changed regions. Furthermore, in embodiments, one or more changed regions and their changed region position values may be sent to another computing device using a network, such as the Internet.

Figure 6A:
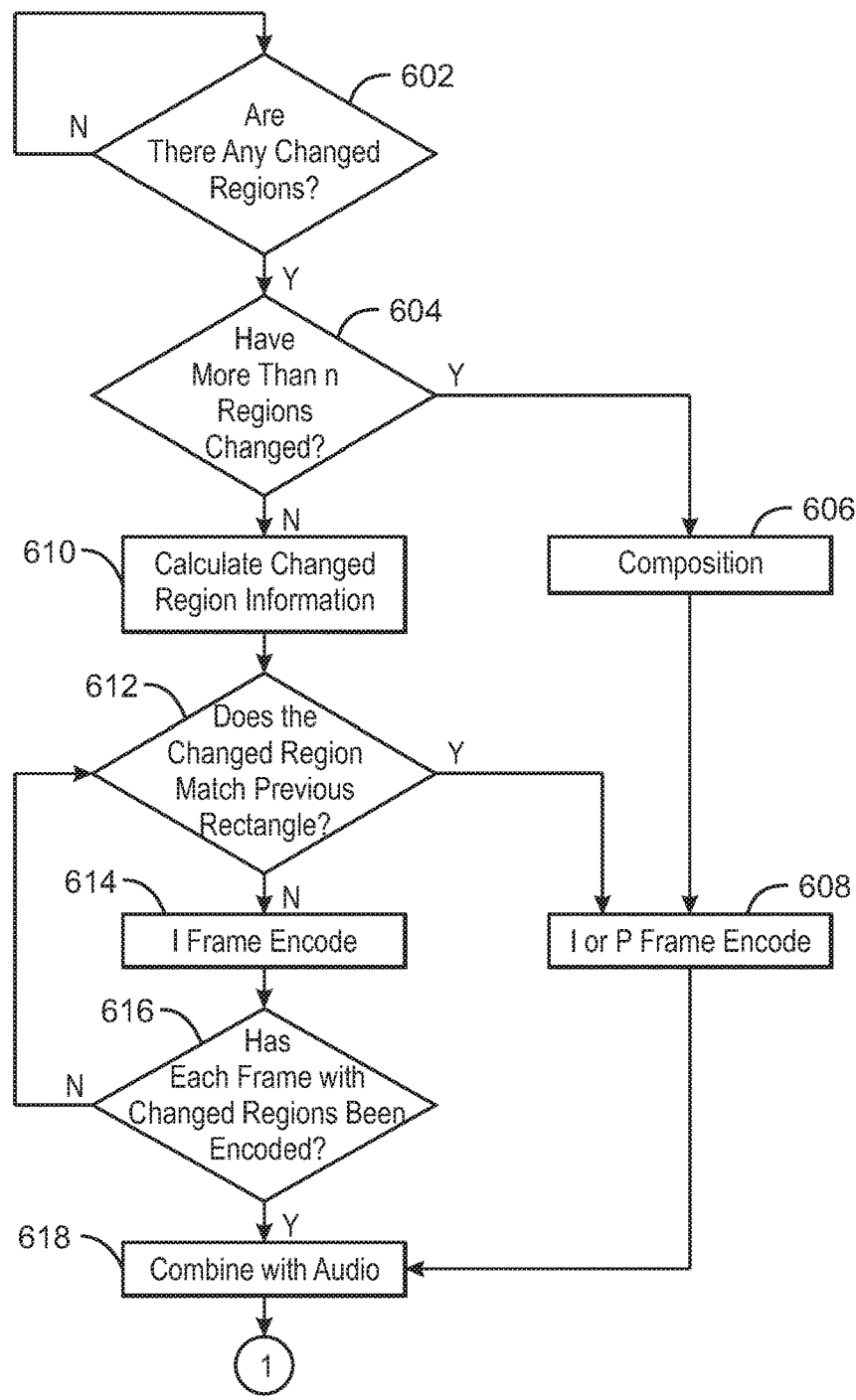
FIG. 6A is a process flow diagram showing a method for media encoding using changed regions, in accordance with embodiments.
Figure 6B:
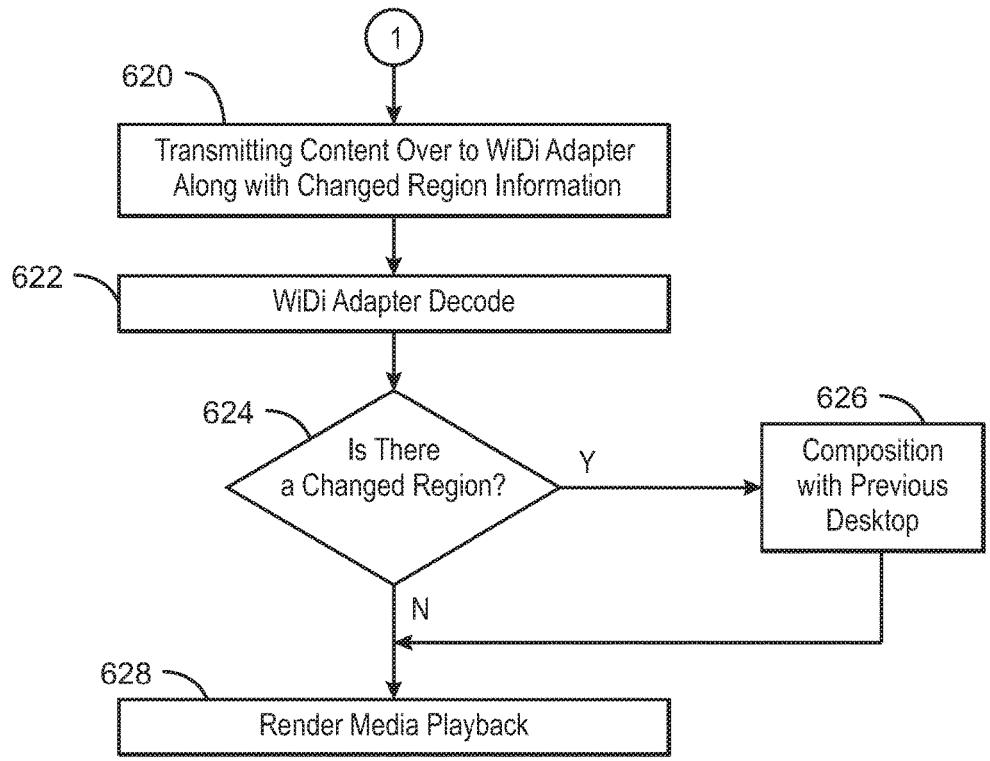
FIG. 6B is a process flow diagram showing a method for media encoding using changed regions, in accordance with embodiments.

FIGS. 6A and 6B are a process flow diagram showing a method 600 for media encoding using changed regions, in accordance with embodiments. In various embodiments, the method 600 may be executed on a computing device, such as the computing device 200. In other embodiments, the method 600 may be executed using a WiDi architecture such as the WiDi architecture 400 discussed above with respect to FIG. 4.

The method 600 begins at block 602 by determining if there are any changed regions. In embodiments, the changed regions may be detected in a video surface of the media encoding or a desktop surface of the media encoding. If there are no changed regions, process flow remains at block 602 until a changed region is detected. When a changed region within the video surface or the desktop surface occurs, process flow continues to block 604.

At block 604, it is determined if more than n regions are dirty. The value of n may be predetermined, and represents a threshold amount of changed regions. If more than n regions are dirty, that may indicate that the user has resized a window or closed the media application. In the case where more than n regions are dirty, the entire display should be composed and rendered. Accordingly, if more than n regions are dirty, then process flow continues to block 606. If less than n regions are dirty, process flow continues to block 610.

At block 606, the entire desktop is composed. In embodiments, changed regions of the desktop are detected by checking a back buffer. The back buffer may include the image information associated with the static portion. The changed regions of the desktop along with the changed region positions may be sent to a remote adapter. The entire desktop may be composed when the amount of changed regions that have changed are greater than the threshold amount n. At block 608, the entire desktop is encoded using intra-coded frames (I-frames) or predictive picture frames (P-frames). When the desktop is encoded using I-frames, each individual frame is fully specified within the encoding. Thus, an I-frame conveys the entire image information without use of data from the previous frames. Each I-frame can be thought of as a complete static image of the media encoding. When the desktop is encoded using P-frames, the changes between the current frame and the previous frame are encoded. The unchanged pixels of the image are not encoded, and the frame relies on some image information from the previous frames when the frame is encoded.

At block 610, the changed region position values are calculated for each changed region. At block 612, it is determined if the position values for each changed region of the current frame are identical to the region position values from the previous frame. If the position values of the changed regions of the current frame matches the position values of the regions in the previous frame, then the changed regions of the current frame can be encoded using either an I-frame or a P-frame. In this scenario, either an I-frame or a P-frame may be used to encode the changed regions of the current frame, as the each changed region has a previous region in the previous frame that is located in the same position. As a result, the previous frame contains image information for each region at each location. Accordingly, the changed regions of the current frame can be fully specified, as is the case when encoding from an I-frame or the changed regions of the current frame may rely on the image information from the previous frame and be encoded using a P-frame.

Thus, when the position values of the changed regions of the current frame matches the position values of the regions in the previous frame, the encoding can be fully specified using one or more I-frames, or the encoding rely on information from the previous frame using one or more P-frames. However, if the position value for any changed region does not match any of the position values from the regions of the previous frame, the changed regions of the current frame will be encoded using one or more I-frames, as the previous frame does not contain image information that corresponds to each region of the current frame. Accordingly, if the position values calculated for the changed region of the current frame are the same as the position values for regions of the previous frame, process flow continues to block 608 where the changed regions of the frame are encoded using I-frames or P-frames, as discussed above. If the position values calculated for the changed region are not the same as the previous changed region, process flow continues to block 614.

At block 614, the changed regions of the frame are encoded using I-frames. At block 616, it is determined if each frame with changed regions has been encoded. If each frame with changed regions has not been encoded, process flow returns to block 612. If each frame with changed regions has been encoded, process flow continues to block 618.

At block 618, the encoded frames are combined with the related audio. At block 620, the encoded frames, related audio, and changed region position values are transmitted to a remote adapter. In embodiments, the encoded frames may be encrypted. For example, certain DVDs may include security features entail encrypting the media encoding before it is transmitted. The video encoding from the DVD is encrypted before transmission, otherwise, the transmission could fail. At block 622, the encoded frames and audio are decoded as discussed above. In embodiments, the encoded frames are decrypted. At block 624 it is determined if there is a changed region in the decoded frames. A changed region may be detected by the presence of changed region position values. If there is a changed region, process flow continues to block 626. If there is no changed region, process flow continues to block 628.

At block 626, the encoded frames are composed with the static desktop using the changed region position values as discussed above. At block 628, the encoded frames and static desktop may be rendered on a remote device.

The process flow diagrams of FIGS. 5 and 6 are not intended to indicate that the blocks of methods 500 and 600 are to be executed in any particular order, or that all of the blocks are to be included in every case. Further, any number of additional blocks may be included within the methods 500 and 600, depending on the details of the specific implementation.

Figure 7:
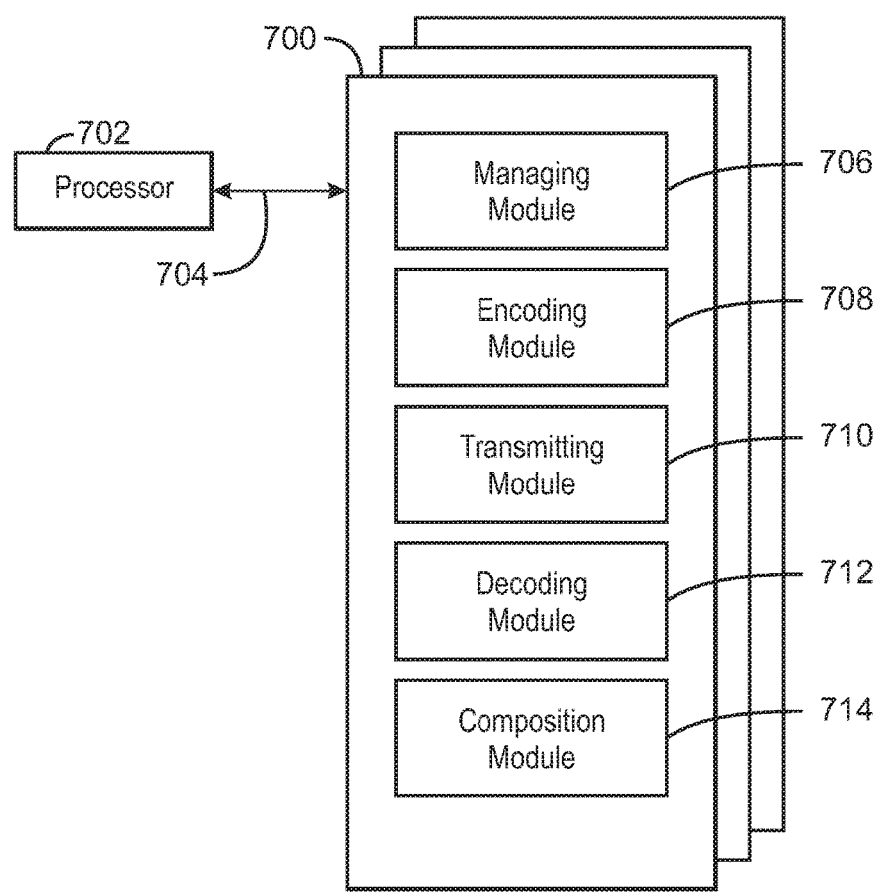
FIG. 7 is a block diagram showing tangible, non-transitory, computer-readable media that stores code for media encoding using changed regions, in accordance with embodiments.

FIG. 7 is a block diagram showing tangible, non-transitory computer-readable media 700 that stores code for media encoding using changed regions, in accordance with embodiments. The tangible, non-transitory computer-readable media 700 may be accessed by a processor 702 over a computer bus 704. Furthermore, the tangible, non-transitory computer-readable media 700 may include code configured to direct the processor 702 to perform the methods described herein.

The various software components discussed herein may be stored on one or more tangible, non-transitory computer-readable media 700, as indicated in FIG. 7. For example, a managing module 706 may be configured to detect the changed regions in the media encoding. An encoding module 708 may be configured to encode the changed regions. Further, a transmitting module 710 may be configured to send the changed regions with their changed region positions to a remote adapter. A decoding module 712 may be configured to decode the changed regions. A composition module 714 may be configured to compose the changed regions with the static portion using the changed region position values.

The block diagram of FIG. 7 is not intended to indicate that the tangible, non-transitory computer-readable media 700 is to include all of the components shown in FIG. 7. Further, the tangible, non-transitory computer-readable media 700 may include any number of additional components not shown in FIG. 7, depending on the details of the specific implementation.

Figure 8:
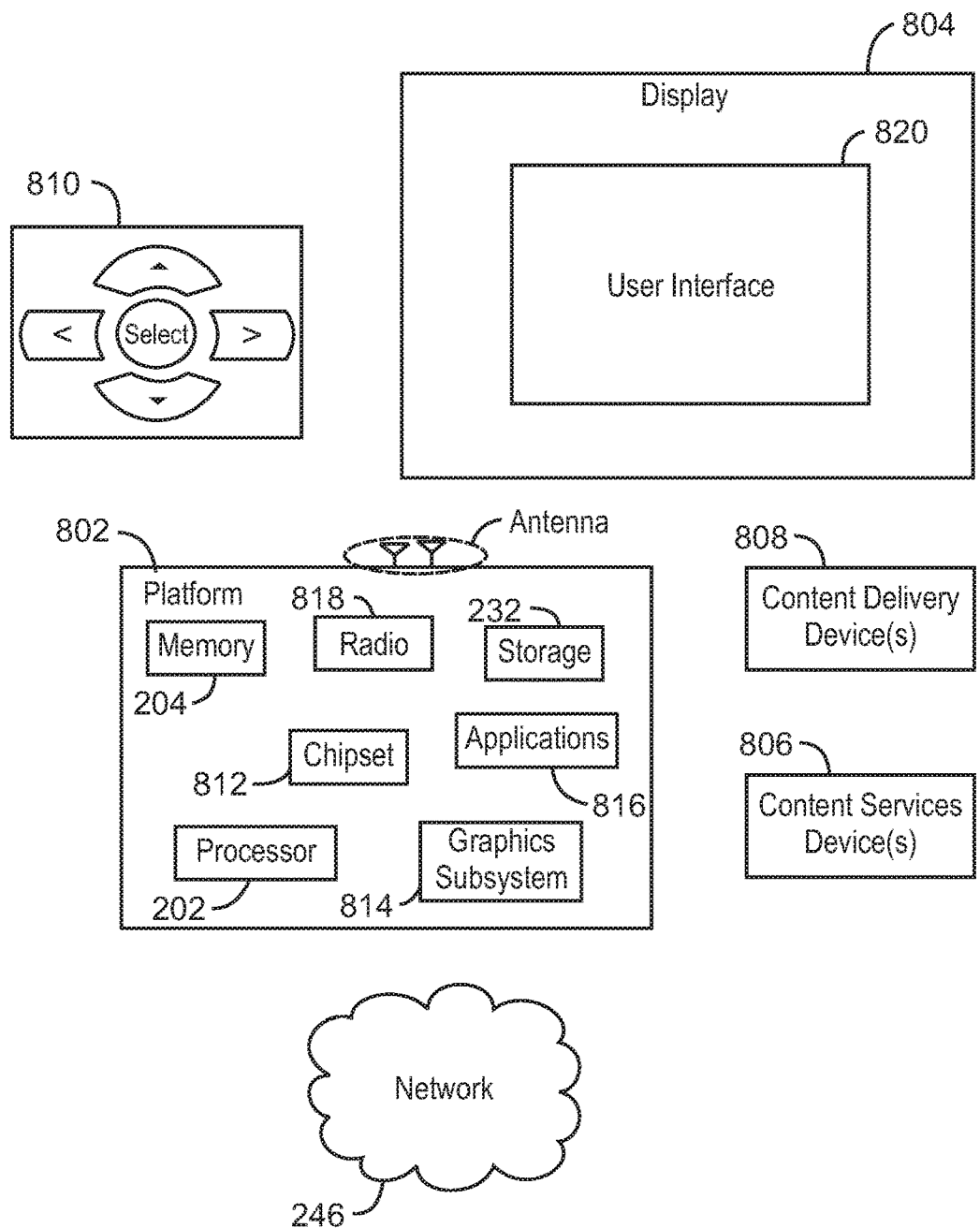
FIG. 8 is a block diagram of an exemplary system for implementing shared physical memory.

FIG. 8 is a block diagram of an exemplary system 800 for implementing shared physical memory. Like numbered items are as described with respect to FIGS. 2, 3, and 4. In some embodiments, the system 800 is a media system. In addition, the system 800 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, or the like.

In various embodiments, the system 800 comprises a platform 802 coupled to a display 804. The platform 802 may receive content from a content device, such as content services device(s) 806 or content delivery device(s) 808, or other similar content sources. A navigation controller 810 including one or more navigation features may be used to interact with, for example, the platform 802 and/or the display 804. Each of these components is described in more detail below.

The platform 802 may include any combination of a chipset 812, a central processing unit (CPU) 202, a memory device 204, a storage device 232, a graphics subsystem 814, applications 816, and a radio 818. The chipset 812 may provide intercommunication among the CPU 102, the memory device 204, the storage device 120, the graphics subsystem 814, the applications 816, and the radio 818. For example, the chipset 812 may include a storage adapter (not shown) capable of providing intercommunication with the storage device 232.

The CPU 102 may be implemented as Complex Instruction Set Computer (CISC) or Reduced Instruction Set Computer (RISC) processors, x86 instruction set compatible processors, multi-core, or any other microprocessor or central processing unit (CPU). In some embodiments, the CPU 102 includes dual-core processor(s), dual-core mobile processor(s), or the like.

The memory device 204 may be implemented as a volatile memory device such as, but not limited to, a Random Access Memory (RAM), Dynamic Random Access Memory (DRAM), or Static RAM (SRAM). The storage device 232 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In some embodiments, the storage device 232 includes technology to increase the storage performance enhanced protection for valuable digital media when multiple hard drives are included, for example.

The graphics subsystem 814 may perform processing of images such as still or video for display. The graphics subsystem 814 may include a graphics processing unit (GPU), such as the GPU 206 (FIG. 2), or a visual processing unit (VPU), for example. An analog or digital interface may be used to communicatively couple the graphics subsystem 814 and the display 804. For example, the interface may be any of a High-Definition Multimedia Interface, DisplayPort, wireless HDMI, and/or wireless HD compliant techniques. The graphics subsystem 814 may be integrated into the CPU 102 or the chipset 812. Alternatively, the graphics subsystem 814 may be a stand-alone card communicatively coupled to the chipset 812.

The graphics and/or video processing techniques described herein may be implemented in various hardware architectures. For example, graphics and/or video functionality may be integrated within the chipset 812. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

The radio 818 may include one or more radios capable of transmitting and receiving signals using various suitable wireless communications techniques. Such techniques may involve communications across one or more wireless networks. Exemplary wireless networks include wireless local area networks (WLANs), wireless personal area networks (WPANs), wireless metropolitan area network (WMANs), cellular networks, satellite networks, or the like. In communicating across such networks, the radio 818 may operate in accordance with one or more applicable standards in any version.

The display 804 may include any television type monitor or display. For example, the display 804 may include a computer display screen, touch screen display, video monitor, television, or the like. The display 804 may be digital and/or analog. In some embodiments, the display 804 is a holographic display. Also, the display 804 may be a transparent surface that may receive a visual projection. Such projections may convey various forms of information, images, objects, or the like. For example, such projections may be a visual overlay for a mobile augmented reality (MAR) application. Under the control of one or more applications 816, the platform 802 may display a user interface 820 on the display 804.

The content services device(s) 806 may be hosted by any national, international, or independent service and, thus, may be accessible to the platform 802 via the Internet, for example. The content services device(s) 806 may be coupled to the platform 802 and/or to the display 804. The platform 802 and/or the content services device(s) 806 may be coupled to a network 246 to communicate (e.g., send and/or receive) media information to and from the network 246. The content delivery device(s) 808 also may be coupled to the platform 802 and/or to the display 804.

The content services device(s) 806 may include a cable television box, personal computer, network, telephone, or Internet-enabled device capable of delivering digital information. In addition, the content services device(s) 806 may include any other similar devices capable of unidirectionally or bidirectionally communicating content between content providers and the platform 802 or the display 804, via the network 246 or directly. It will be appreciated that the content may be communicated unidirectionally and/or bidirectionally to and from any one of the components in the system 800 and a content provider via the network 246. Examples of content may include any media information including, for example, video, music, medical and gaming information, and so forth.

The content services device(s) 806 may receive content such as cable television programming including media information, digital information, or other content. Examples of content providers may include any cable or satellite television or radio or Internet content providers, among others.

In some embodiments, the platform 802 receives control signals from the navigation controller 810, which includes one or more navigation features. The navigation features of the navigation controller 810 may be used to interact with the user interface 820, for example. The navigation controller 810 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures. Physical gestures include but are not limited to facial expressions, facial movements, movement of various limbs, body movements, body language or any combination thereof. Such physical gestures can be recognized and translated into commands or instructions.

Movements of the navigation features of the navigation controller 810 may be echoed on the display 804 by movements of a pointer, cursor, focus ring, or other visual indicators displayed on the display 804. For example, under the control of the applications 816, the navigation features located on the navigation controller 810 may be mapped to virtual navigation features displayed on the user interface 820. In some embodiments, the navigation controller 810 may not be a separate component but, rather, may be integrated into the platform 802 and/or the display 804.

The system 800 may include drivers (not shown) that include technology to enable users to instantly turn on and off the platform 802 with the touch of a button after initial boot-up, when enabled, for example. Program logic may allow the platform 802 to stream content to media adaptors or other content services device(s) 806 or content delivery device(s) 808 when the platform is turned "off." In addition, the chipset 812 may include hardware and/or software support for 5.1 surround sound audio and/or high definition 9.1 surround sound audio, for example. The drivers may include a graphics driver for integrated graphics platforms. In some embodiments, the graphics driver includes a peripheral component interconnect express (PCIe) graphics card.

In various embodiments, any one or more of the components shown in the system 800 may be integrated. For example, the platform 802 and the content services device(s) 806 may be integrated; the platform 802 and the content delivery device(s) 808 may be integrated; or the platform 802, the content services device(s) 806, and the content delivery device(s) 808 may be integrated. In some embodiments, the platform 802 and the display 804 are an integrated unit. The display 804 and the content service device(s) 806 may be integrated, or the display 804 and the content delivery device(s) 808 may be integrated, for example.

The system 800 may be implemented as a wireless system or a wired system. When implemented as a wireless system, the system 800 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum. When implemented as a wired system, the system 800 may include components and interfaces suitable for communicating over wired communications media, such as input/output (I/O) adapters, physical connectors to connect the I/O adapter with a corresponding wired communications medium, a network interface card (NIC), disc controller, video controller, audio controller, or the like. Examples of wired communications media may include a wire, cable, metal leads, printed circuit board (PCB), backplane, switch fabric, semiconductor material, twisted-pair wire, co-axial cable, fiber optics, or the like.

The platform 802 may establish one or more logical or physical channels to communicate information. The information may include media information and control information. Media information may refer to any data representing content meant for a user. Examples of content may include, for example, data from a voice conversation, videoconference, streaming video, electronic mail (email) message, voice mail message, alphanumeric symbols, graphics, image, video, text, and the like. Data from a voice conversation may be, for example, speech information, silence periods, background noise, comfort noise, tones, and the like. Control information may refer to any data representing commands, instructions or control words meant for an automated system. For example, control information may be used to route media information through a system, or instruct a node to process the media information in a predetermined manner. The embodiments, however, are not limited to the elements or the context shown or described in FIG. 8.

Figure 9:
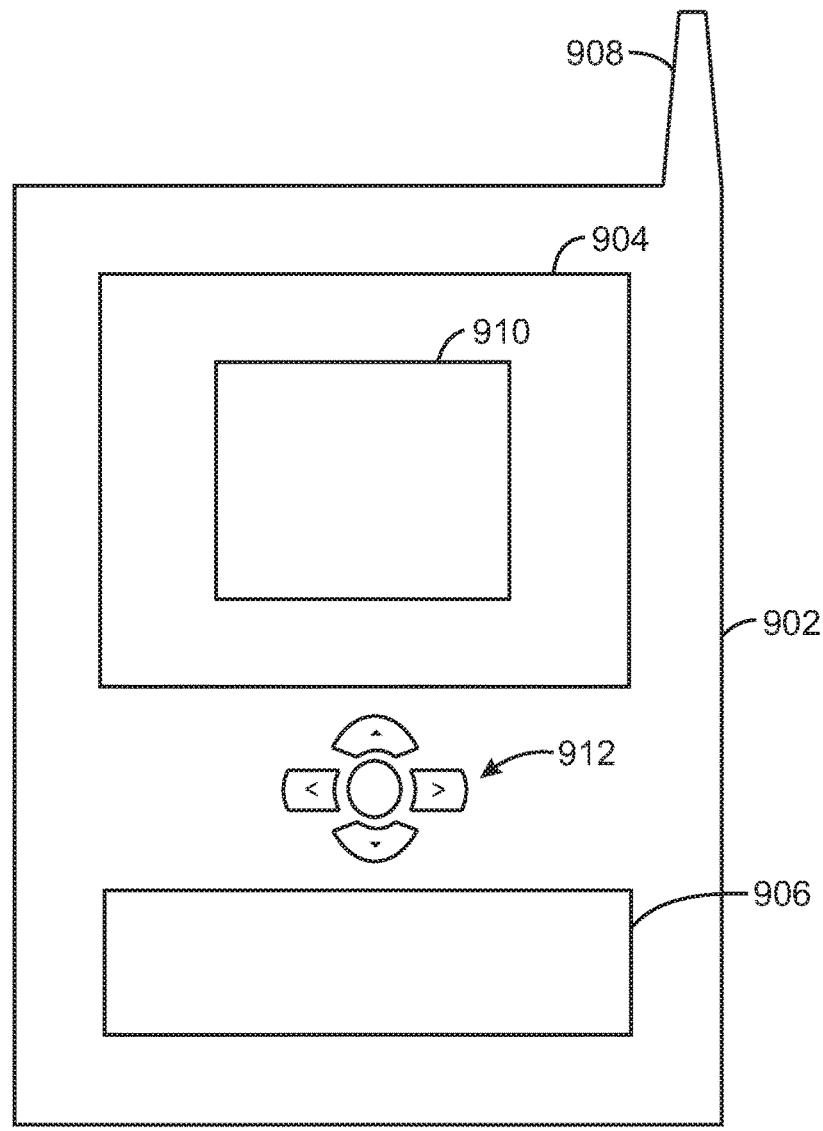
FIG. 9 is a schematic of a small form factor device in which the system of FIG. 8 may be embodied.

FIG. 9 is a schematic of a small form factor device 900 in which the system 800 of FIG. 8 may be embodied. Like numbered items are as described with respect to FIG. 8. In some embodiments, for example, the device 900 is implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and the like.

An example of a mobile computing device may also include a computer that is arranged to be worn by a person, such as a wrist computer, finger computer, ring computer, eyeglass computer, belt-clip computer, arm-band computer, shoe computer, clothing computer, or any other suitable type of wearable computer. For example, the mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well.

As shown in FIG. 9, the device 900 may include a housing 902, a display 904, an input/output (I/O) device 906, and an antenna 908. The device 900 may also include navigation features 910. The display 904 may include any suitable display unit for displaying information appropriate for a mobile computing device. The I/O device 906 may include any suitable I/O device for entering information into a mobile computing device. For example, the I/O device 906 may include an alphanumeric keyboard, a numeric keypad, a touch pad, input keys, buttons, switches, rocker switches, microphones, speakers, a voice recognition device and software, or the like. Information may also be entered into the device 900 by way of microphone. Such information may be digitized by a voice recognition device.

EXAMPLE 1

A method for media encoding using changed regions is described herein. The method includes detecting any changed regions and a static portion of a desktop. The changed regions may be encoded and sent to a composition engine along with their changed region position values. The changed regions may be decoded and composed with the static portion using the changed region position values.

The changed regions may be sent with the changed region position values to a composition engine located on a remote adapter. Additionally, the changed regions may be encrypted and decrypted. Further, the composition engine may be located on the computing device where the changed regions and the static portion of the desktop are detected. In embodiments, the changed regions may be detected by checking a back buffer, and the changed regions may be sent with the changed region positions to a remote adapter.

The encoding may include encoding from the I-frame if the changed region position values do not match previous changed region position values. Further, the encoding may include encoding from the I-frame or the P-frame if the changed region position values match previous changed region position values. The method may also include iteratively encoding, decoding, and composing multiple changed regions. Additionally, a media application may use polling, pushing, pulling, or a timer to compose image information.

EXAMPLE 2

A computing device is described herein. The computing device includes a central processing unit (CPU) that is configured to execute stored instructions and a storage device that stores instructions. The storage device includes processor executable code that, when executed by the CPU, is configured to detect any regions and a static portion of a desktop of the computing device. The changed regions may be encoded. Additionally, the changed regions and their position values may be sent to a composition engine. The changed regions may be decoded and composed with the static portion using the changed region position values.

The processor executable code may be configured to encrypt and decrypt the changed regions. The composition engine may be located on a remote adapter, and the changed regions can be decoded at the remote adapter. The computing device may be configured to detect the changed regions by checking a back buffer, and the changed regions may be sent with the changed region position values to a remote adapter. The computing device may also be configured to encode from the I-frame if the changed region position values do not match previous changed region position values. Further, the computing device may be configured to encode from the I-frame or the P-frame if the changed region position values match previous changed region position values. The computing device may be configured to iteratively encode, decode, and compose multiple changed regions. Additionally, the computing device may be configured to poll, push, pull, or use a timer to compose image information from a media application. The computing device may also include radio and a display, and the radio and display may be communicatively coupled at least to the central processing unit.

EXAMPLE 3

At least one non-transitory machine readable medium having instructions stored therein is described herein. In response to being executed on a computing device, the instructions cause the computing device to detect any changed regions and a static portion of a desktop of the computing device. The changed regions may be encoded. The instructions may also cause the computing device to send the changed regions with their changed region position values to a composition engine. The changed regions may be decoded and composed with the static portion of the desktop using the changed region position values.

The changed regions and their changed region position values may be sent to the composition engine, and the composition engine may be located on a remote adapter. The changed regions may be decoded at the remote adapter. Further, the changed regions are encrypted and decrypted.

It is to be understood that specifics in the aforementioned examples may be used anywhere in one or more embodiments. For instance, all optional features of the computing device described above may also be implemented with respect to either of the methods or the computer-readable medium described herein. Furthermore, although flow diagrams and/or state diagrams may have been used herein to describe embodiments, the inventions are not limited to those diagrams or to corresponding descriptions herein. For example, flow need not move through each illustrated box or state or in exactly the same order as illustrated and described herein.

The inventions are not restricted to the particular details listed herein. Indeed, those skilled in the art having the benefit of this disclosure will appreciate that many other variations from the foregoing description and drawings may be made within the scope of the present inventions. Accordingly, it is the following claims including any amendments thereto that define the scope of the inventions.

What is claimed is:

1. A method for media encoding using dirty regions, comprising:
   determining a number of dirty regions, wherein a change in a pre-determined number of pixels is to indicate a dirty region;
   writing the dirty regions to a buffer;
   encoding the dirty regions in response to the number of dirty regions being greater than a threshold number, without encoding a desktop surface.

2. The method of claim 1, comprising:
   sending the dirty regions and dirty region position values to a composition engine;

decoding the dirty regions; and composing the dirty regions with the desktop surface using the dirty region position values.

3. The method of claim 1, wherein each dirty region is detected when a number of changed pixels within a region is greater than a predetermined threshold.

4. The method of claim 1, comprising:

sending the dirty regions and any dirty region position values to a composition engine, wherein the composition engine is located on a remote adapter; and decoding the dirty regions at the remote adapter.

5. The method of claim 1, wherein a composition engine is located on the computing device where the dirty regions are detected.

6. The method of claim 1, further comprising:

detecting the dirty regions by checking a back buffer;

sending the dirty regions with any dirty region positions to a remote adapter.

7. The method of claim 1, comprising encoding from an I-frame in response to dirty region position values not matching previous dirty region position values.

8. The method of claim 1, comprising encoding from an I-frame or a P-frame in response to dirty region position values matching previous dirty region position values.

9. The method of claim 1, comprising iteratively detecting, determining, and encoding dirty regions.

10. A computing device, comprising:

a central processing unit (CPU) that is configured to execute stored instructions and a storage device that stores instructions, wherein the storage device includes processor executable code that, when executed by the CPU, is configured to:

determine a number of dirty regions, wherein a change in a pre-determined number of pixels is to indicate a dirty region; and an encoder configured to encode the dirty regions in response to the number of dirty regions being greater than a threshold number, without encoding a desktop surface.

11. The computing device of claim 10, wherein the processor executable code, when executed by the CPU, is configured to:

send the dirty regions and dirty region position values to a composition engine;

decode the dirty regions; and compose the dirty regions with the desktop surface using the dirty region position values.

12. The computing device of claim 10, wherein each dirty region is detected when a number of changed pixels within a region is greater than a predetermined threshold.

13. The computing device of claim 10, wherein the processor executable code, when executed by the CPU, is configured to:

send the dirty regions and any dirty region position values to a composition engine, wherein the composition engine is located on a remote adapter; and decode the dirty regions at the remote adapter.

14. The computing device of claim 10, further comprising a composition engine.

15. The computing device of claim 10, wherein the computing device is configured to:

detect the dirty regions by checking a back buffer;

send the dirty regions with any dirty region position values to a remote adapter.

16. The computing device of claim 10, wherein the computing device is configured to encode from an I-frame in response to dirty region position values not matching previous dirty region position values.

17. The computing device of claim 10, wherein the computing device is configured to encode from an I-frame or a P-frame in response to the dirty region position values matching previous dirty region position values.

18. The computing device of claim 10, wherein the computing device is configured to iteratively detect, determine, and encode dirty regions.

19. The computing device of claim 10, wherein the computing device is configured to poll, push, pull, or use a timer to compose image information from a media application.

20. The computing device of claim 10, further comprising a radio and a display, the radio and display communicatively coupled at least to the central processing unit.

21. At least one non-transitory machine readable medium having instructions stored therein that, in response to being executed on a computing device, cause the computing device to:

determine a number of dirty regions, wherein a change in a pre-determined number of pixels is to indicate a dirty region; and encode the dirty regions in response to the number of dirty regions being greater than a threshold number, without encoding a desktop surface.

22. The at least one non-transitory machine readable medium of claim 21, having instructions stored therein that, in response to being executed on a computing device, cause the computing device to:

send the dirty regions and dirty region position values to a composition engine;

decode the dirty regions; and compose the dirty regions with a static portion of the desktop using the dirty region position values.

23. The at least one non-transitory machine readable medium of claim 21, wherein each dirty region is detected when the number of changed pixels within a region is greater than a predetermined threshold.

* * * * *